UNITED STATES PATENT OFFICE.

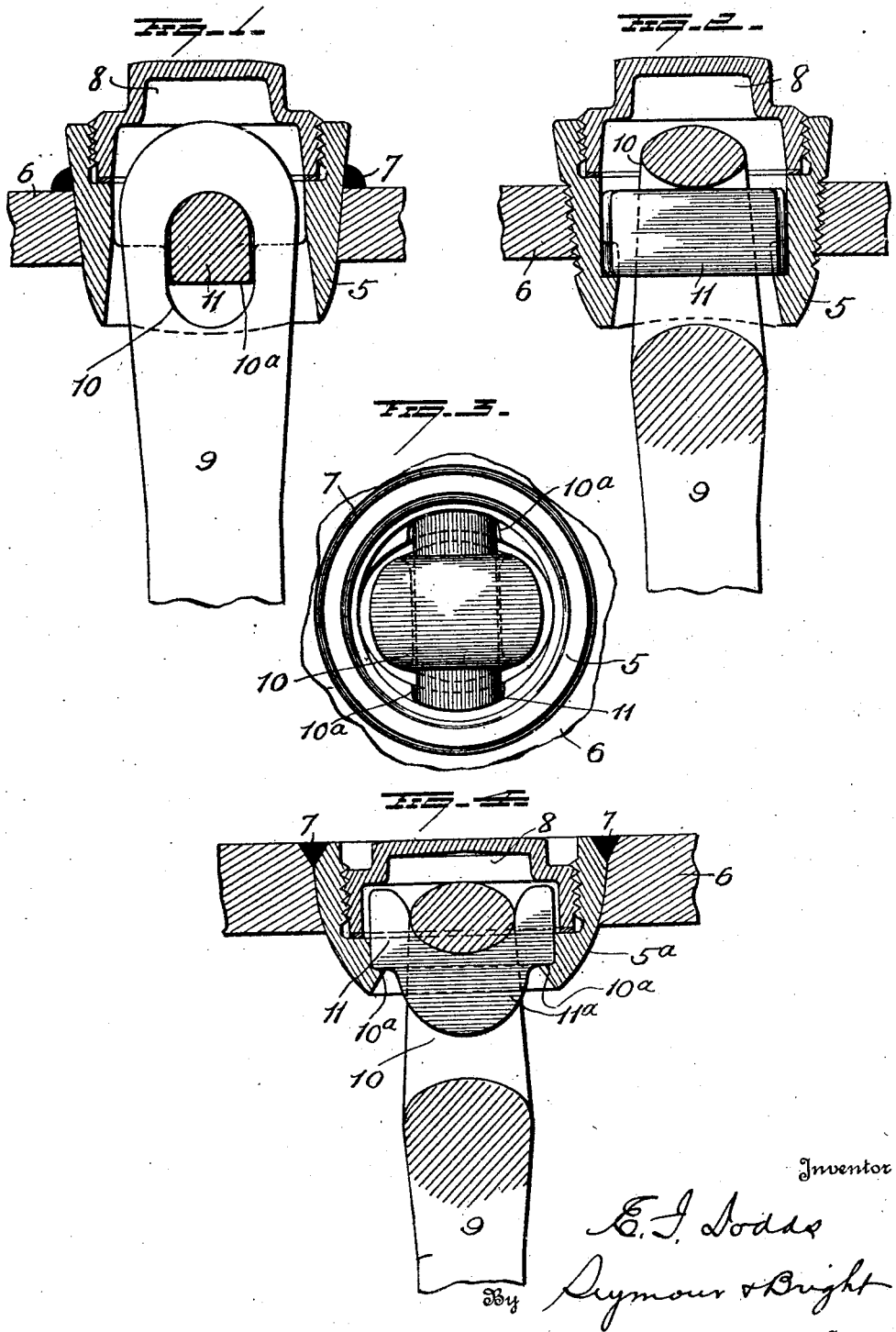

ETHAN I. DODDS, OF CENTRAL VALLEY, NEW YORK, ASSIGNOR TO FLANNERY BOLT COMPANY, OF PITTSBURGH, PENNSYLVANIA.

STAY-BOLT STRUCTURE.

1,410,005. Specification of Letters Patent. Patented Mar. 21, 1922.

Application filed February 16, 1921. Serial No. 445,459.

*To all whom it may concern:*

Be it known that I, ETHAN I. DODDS, a citizen of the United States, and a resident of Central Valley, in the county of Orange and State of New York, have invented certain new and useful Improvements in Stay-Bolt Structures; and I do hereby declare the following to be a full, clear, and exact description of the invention, such as will enable others skilled in the art to which it appertains to make and use the same.

My invention relates to an improvement in staybolt structures and it consists in a bolt bearing member adapted for attachment to a boiler sheet, and a bolt having a link shaped end mounted on a cross bar removably supported in said bearing member, whereby the bolt has a free and universal movement in said bearing member, and is also free to move outwardly under collapsing stresses on the boiler sheets.

It further consists in the details of construction as will be more fully described and pointed out in the claims.

In the accompanying drawings, Figure 1 is a view in cross section of a bolt bearing member and bolt carried thereby; Figure 2 is a similar view of a slightly modified form taken at right angles to Figure 1, Figure 3 is a view in plan, the cap being removed and Figure 4 is a view similar to Figure 2 of a modified construction.

5 represents a bearing member which in Figures 1 and 2 is in the form of a tapering sleeve terminating in a curved inner end. This sleeve may be threaded as in Figure 2 for its attachment to the wall of a threaded opening in the outer sheet 6 of a boiler or it may be plain, as in Figure 1 and welded as at 7 to the sheet 6, the manner of securing the sleeve or bolt bearing member to the sheet being immaterial. The bearing member 5 is hollow and threaded preferably internally at its outer end for the attachment of the cap 8 which closes the outer end of said bearing member.

9 is the stay bolt adapted for attachment to the inner sheet (not shown) of the boiler in the usual and well known manner, and is flattened and enlarged and provided at its outer end with an eye or link 10 for the passage of the cross bar 11. This bar 11 is preferably loosely mounted at its ends in recessed seats formed in the sleeve or bearing member 5, and is of such length that it is held from endwise movement and can only be removed through the outer open end of said bearing member. It is preferably rounded on its top surface and is of less depth than the length of the eye 10 in the bolt so as to permit of outward or expansive movement of the bolt on the bar. The widest part of the bar is narrower than the opening through the lower end of the bearing member so that the bolt may be free to swing in any direction on the bar.

In the construction shown in Figures 1, 2 and 3 the bar is held against a rotating movement by the walls of the recessed seat 10. In Figure 4 which represents my improvement applied to a flush bearing, the bar 11ª is bowed so as to provide for a longitudinal movement of the bolt between the cap 8 and the outer end of the bolt, and the shoulder 10ª on which the bar 11ª is mounted at its ends is made flat and continuous so that the bar 11ª is free to turn therein. In this construction the wall of the bolt opening is formed in the arc of a circle, and the bearing member 5ª is similarly shaped so that it is capable of initial universal adjustment in the sheet 6 and is permanently secured by welding as at 7 after it has been adjusted.

In applying the bolt 9 supported as in Figures 1 and 2, the bearing member or sleeve 5 can be turned by a wrench to screw the inner end of the bolt to the inner boiler sheet, or if the bolt is to be secured solely by upsetting the inner end of the bolt the latter can be driven or forced into place by pressure or force applied to the outer end of the bolt. In the construction shown in Figure 4, the bolt or bar 11ª may be engaged by a suitable tool for turning the bolt to screw it to the inner sheet, or if it be secured by upsetting, the force necessary to drive it into the bolt opening in the inner sheet should be applied directly to the head or outer end of the bolt. In both forms the bolt is suspended for universal movement on the bar and is free to elongate and contact longitudinally. The cap 8 in addition to forming a closure for the bearing member also forms an abutment for taking excessive collapsing stresses and is freely removable to permit of the ready inspection of the bolt at all times.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. In a stay bolt structure the combination of a bearing member, a bolt having an eye at its outer end and a cross bar independent of the bolt and bearing member and passing through the eye of the bolt and supported at its ends on seats in the bearing member.

2. In a stay bolt structure, the combination of a bearing member, a bolt having an eye at its outer end, a cross bar passing through the eye of the bolt and supported at its ends on seats in the bearing member and a cap closing the latter.

3. In a staybolt structure, the combination of a bearing member, a bolt having an eye at its outer end, a cross bar passing through the eye of the bolt and supported at its ends on seats within the bearing member, the eye on the bolt being of greater depth than the cross bar so as to permit of longitudinal movement of the bolt on the bar, and a cap closing the outer end of the bearing member.

4. In a stay bolt structure, the combination of a bearing member having an internal seat, a bowed cross bar mounted at its ends on said seat, and a bolt provided at its outer end with an eye for the passage of the cross bar, whereby the latter will be supported by the said bar.

5. In a staybolt structure, the combination of a bearing member having an internal annular shoulder, a bowed cross bar mounted at its ends on said shoulder, a stay bolt having an eye adapted to receive the cross bar and be supported by the latter and a screw cap closing the outer end of the bearing member.

In testimony whereof, I have signed this specification in the presence of a subscribing witness.

ETHAN I. DODDS.

Witness:
EDWIN S. RYCE.